Oct. 27, 1970  R. V. JACKSON  3,536,982
CONTROL CIRCUIT FOR DIRECT CURRENT STARTER-GENERATOR
Filed Oct. 16, 1967
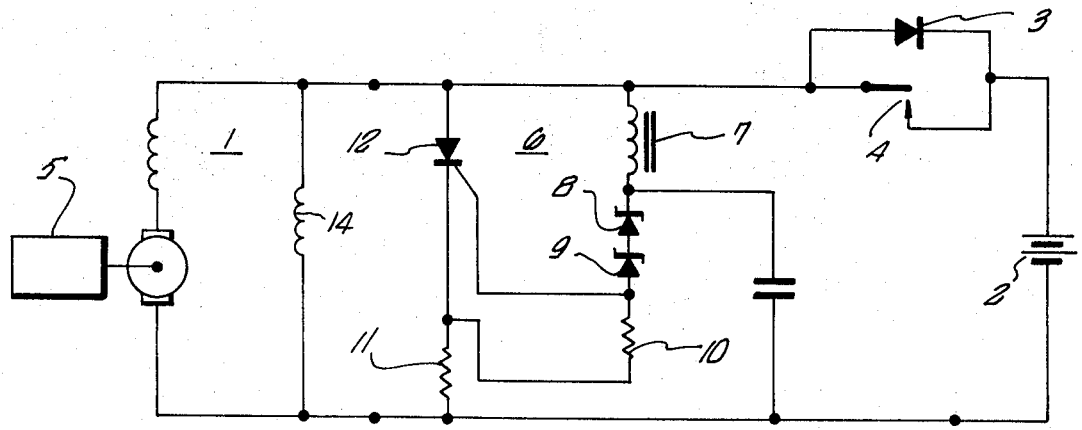
PRIOR ART
FIG_1_
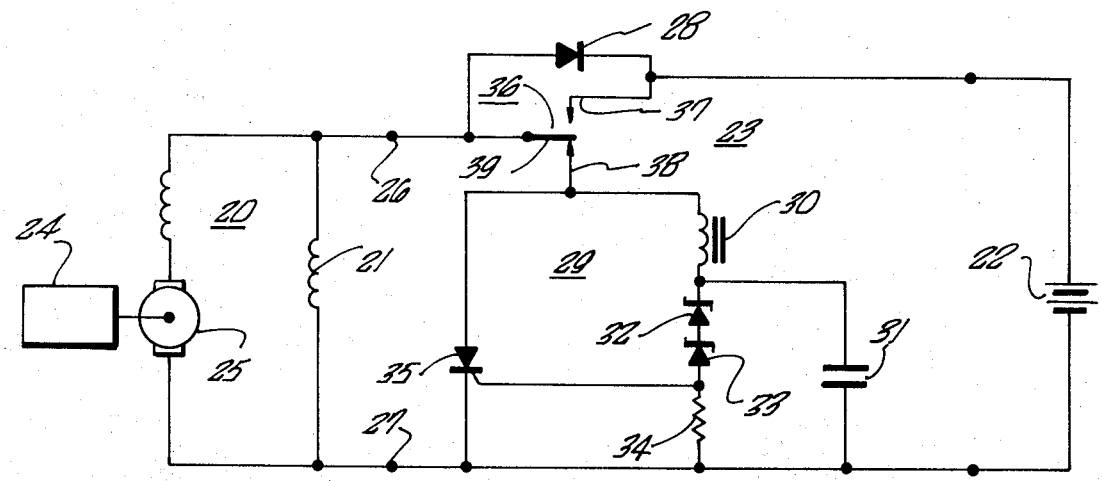
FIG_2_
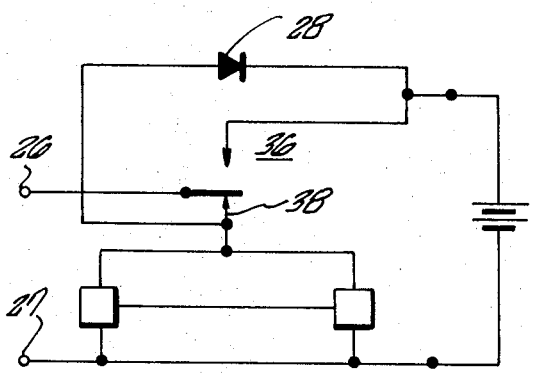
FIG_3_
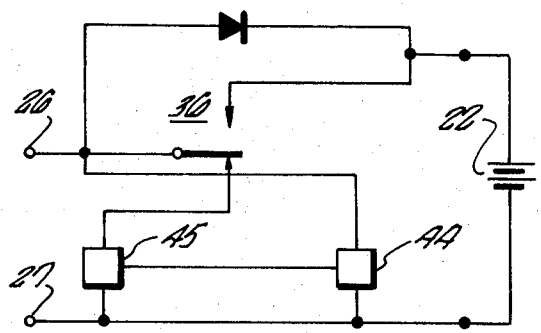
FIG_4_

United States Patent Office 3,536,982
Patented Oct. 27, 1970

3,536,982
CONTROL CIRCUIT FOR DIRECT CURRENT STARTER-GENERATOR
Robert V. Jackson, Los Angeles, Calif., assignor to McCulloch Corporation, Los Angeles, Calif., a corporation of Wisconsin
Filed Oct. 16, 1967, Ser. No. 675,508
Int. Cl. H02j 7/14
U.S. Cl. 320—63   8 Claims

ABSTRACT OF THE DISCLOSURE

Protection is provided for a voltage responsive cut-off circuit that cuts off the charging current supplied to a battery by a motor-generator operating as a generator. Generally, such cut-off circuits are designed for passage of low current only and would be damaged if connected to the battery by the accidental closing of the starter switch when the motor-generator is operating as a generator. To prevent excessive current flow through the cut-off circuit, the cut-off circuit is disconnected from the battery and the motor-generator when the starter switch for the system is closed.

BACKGROUND OF THE INVENTION

Field of the invention

This invention relates generally to a voltage responsive cut-off circuit between a motor-generator and a battery, and more particularly to the protection of the cut-off circuit from excessive currents.

Motor-generators are advantageously employed as starters for internal combustion engines, with the energy for the starting operation being supplied by a battery. Thereafter, the battery is recharged when the motor-generator is driven by the internal combustion engine and the motor-generator functions as a generator.

These motor-generators are particularly useful for the starting of portable tools, such as chain saws. However, for this type of application, it is desirable that the starting system be as light as possible to add the least weight to the portable tool.

However, in addition to the motor-generator and battery for the starter system, it has been found that some sort of voltage regulator is necessary between the battery and the generator to prevent overcharging of the battery and to prevent the discharge of the battery after the engine has been cranked, but before the engine is up to the speed for the output voltage of the generator to exceed the battery voltage.

DESCRIPTION OF THE PRIOR ART

The charging of batteries by a motor-generator system has been controlled in the past by employing voltage regulators between the generator and the battery or voltage responsive cut-off circuits between the generator and the battery. Voltage responsive cut-off circuits are described in copending application Ser. No. 621,014, filed Mar. 6, 1967, entitled "Voltage Cut-off Circuits" and assigned to the same assignee as the present application, now Pat. No. 3,436,639, issued Apr. 1, 1969, which application was a continuation-in-part of application Ser. No. 530,129, filed Feb. 25, 1966, entitled Voltage Cut-Off Circuits and assigned to the same assignee as the present application and now Pat. No. 3,454,860, issued July 8, 1969.

However, in the prior art control circuits for batteries being charged from variable speed generators, such as the motor-generators on chain saws, the circuit is left across the output terminals of the generator and may be subjected to the current flow from the battery. In order to protect the elements of the cut-off circuit, current-limiting means, such as resistors, have been employed in the past.

Additionally, the elements were relatively large and of sufficient size to withstand the high current from the battery, and were, therefore, also relatively costly. The large size of the elements and the requirement of additional elements, such as current-limiting resistors, have increased the cost size, and weight of such starter-generator systems. The increased size and weight are very undesirable when the motor-generator system is employed as an electric start for hand tools, such as chain saws.

SUMMARY OF THE INVENTION

In accordance with the present invention the size of the components and the weight of the starter-generator system is significantly reduced, as well as a reduction in cost is effectuated, by providing a means for disconnecting the voltage responsive cut-off circuit when the current path from the battery to the motor-generator is completed. The motor-generator system of the present invention includes a direct-current motor-generator having at least a shunt field winding with the output terminals of the motor-generator being connected to a battery through a blocking diode poled to prevent current flow from the battery to the motor generator. A starting switch is connected across the blocking diode to bypass the diode to complete the current path from the battery to the motor-generator to operate it as a motor.

Across the output terminals of the generator there is connected a voltage responsive cut-off circuit which includes a switch to short-circuit the shunt winding of the motor-generator to prevent further charging of the battery when the battery terminal voltage reaches a preselected value. The voltage responsive cut-off circuit includes means for monitoring the terminal voltage of the battery which means may be connected across the series connection of the blocking diode and battery.

At least the switching portion of the voltage responsive cut-off circuit that short circuits the shunt field winding is connected to the battery through a fixed contact and the movable element of a switch, which switch has a second fixed contact which is a part of the starter switch across the blocking diode. Thus, the control circuit between the generator and battery includes a means for simultaneously disconnecting at least the switching portion of the voltage responsive cut-off circuit from across the battery and connecting the battery to the motor-generator for supplying current to operate the motor-generator as a motor. In this way, the battery current never passes through the switching portion of the voltage responsive cut-off circuit, even if the starter switch is accidentally closed, so that the need for current-limiting resistors is eliminated and the current rating for the switching elements is substantially reduced so that smaller, cheaper, and lighterweight elements may be used.

BRIEF DESCRIPTION OF THE DRAWING

The above and other features and advantages of the present invention may be understood more fully and clearly upon consideration of the following specification and the accompanying drawing in which:

FIG. 1 is a schematic diagram of a prior art voltage cut-off circuit between a motor-generator and a battery;

FIG. 2 is a schematic diagram of the improved control circuit between a motor-generator and a battery in accordance with the present invention; and FIGS. 3 and 4 are schematic diagrams, partially in block form, of alternative embodiments of the control circuit for starter-generator systems, in accordance with the present invention.

DESCRIPTION OF THE PREFERRED EMBODIMENT

The prior art voltage cut-off circuit of FIG. 1 is described in the above-identified application, now Pat. No. 3,436,639, and includes current-limiting resistors and elements having high current ratings to protect against damage that might result from current from the battery and high current surges generated when the brushes bounce or skip.

In FIG. 1, a motor-generator 1 is connected to a battery 2 through a blocking diode 3. The blocking diode is poled to prevent current flow from the battery 2 to the motor-generator and to permit flow from the generator to the battery. In this way, when the terminal voltage of the motor-generator 1 exceeds the voltage drop across diode 3 and the terminal voltage of the battery 2, current will flow to the battery to charge the battery.

A current path from the battery to the motor-generator 1 is provided by a switch 4 which is connected across and bypasses the diode 3. The switch 4 operates as a starting switch for applying the battery voltage to the motor-generator 1 when it is desired to crank the internal combustion engine, schematically represented by block 5, to which the motor-generator is mechanically coupled. After starting the engine 5, the motor-generator 1 will operate as a generator to replace the energy expended by the battery 2 in cranking the engine 5. When the engine starts, the starting switch 4 is opened and the current path for charging the battery is through the diode 3.

The terminal voltage of the battery is monitored to prevent damage to the battery by excessive charging and the charging stopped by the voltage cut-off circuit 6 which is connected across the output terminals of the motor-generator 1. The cut-off circuit includes a voltage-monitoring portion and a portion for short-circuiting the shunt winding of the motor-generator 1.

A voltage directly proportional to the terminal voltage of the battery appears across an inductor 7, Zener diodes 8 and 9, and resistors 10 and 11 connected in series, which series connection forms the voltage-monitoring portion of the cut-off circuit. When the terminal voltage exceeds the breakdown voltage of the Zener diodes 8 and 9 current will flow through the resistors 10 and 11 so that a voltage drop will appear across resistor 10. The voltage drop across resistor 10 is applied to the trigger terminal of a silicon-controlled rectifier 12 which acts as a switch across the shunt winding of the motor-generator 1 for short-circuiting the shunt winding 14 to reduce the output of the motor-generator 1 below that required for current to flow through the battery 2 and diode 3. Thus, the closing of the switch or the operation of the silicon-controlled rectifier 12 stops the charging of the battery 2, when the terminal voltage of the battery reaches a predetermined value which causes the Zener diodes 8 and 9 to break down and trigger the silicon-controlled rectifier "on."

Resistor 11 is connected in the current path of the silicon-controlled rectifier 12 to limit the current through the rectifier 12 to prevent possible damage from battery current and higher than normal transient currents. The higher current may result from transient current surges that may be developed because of brush skip due to vibrations that the motor-generator is subjected to when the internal combustion engine is in operation. This is especially true, where the engine is the prime mover for a chain saw or some similar portable tool, or employed as the motor on a boat, for example.

The current-limiting resistor 11 is primarily used for limiting the current through the silicon-controlled rectifier 12 in case the starting switch 4 is accidentally closed after the silicon-controlled rectifier 12 has been triggered "on" and is conducting. This current has a much higher average value than does any current that may result from transient voltages and is, therefore, the only undesirable current of consequence that may flow through the cut-off circuit. Thus, because of the possibility of battery current, rectifier 12 has to be relatively large and, consequently, it is relatively expensive and heavy. Additionally, the current-limiting resistor 11 is relatively bulky and heavy, and therefore very undesirable in motor-generator systems of many devices such as portable tools, for example.

The motor-generator system may be lighter, less costly, and smaller when the control circuit of the present invention is employed, wherein, at least the switching portion of the voltage cut-off circuit is disconnected from the current path of the battery when the starter switch is closed. This is accomplished by providing means for simultaneously opening the current path from the battery through the voltage responsive cut-off circuit when the starter switch is closed. Such a circuit is shown in schematic form in FIG. 2.

In FIG. 2 a motor-generator 20, having a shunt winding 21, is coupled with a battery 22 through a control system 23 to form a motor-generator system for the starting of an internal combustion engine, schematically shown by block 24, which is mechanically coupled to the armature 25 of the motor-generator 20. The motor-generator 20 has two output terminals 26 and 27 which are coupled to the battery 22 through the control circuit 23.

The control circuit 23 includes a unilateral impedance element, schematically shown as a diode 28, connected directly in the current path between the motor-generator 20 and battery 22. Diode 28 prevents further discharge of the battery 22 between the period of time when the cranking function of the motor-generator 20 is completed and the time when the motor-generator 20 is driven at a sufficiently high speed to generate a voltage in excess of the terminal voltage of the battery 22 to recharge the battery 22.

The control circuit 23 further includes a voltage responsive cut-off circuit 29 similar to the voltage responsive cut-off circuit of the system of FIG. 1. This voltage responsive cut-off circuit 29 could be of some other design as long as it provides a means for discontinuing the charging of the battery 22 when the desired charge level of the battery is reached. For example, electromechanical switches could be employed in place of the electronic switch, which is shown as a silicon-controlled rectifier 12 in FIG. 1.

The voltage responsive cut-off circuit 29 of FIG. 2 includes a means for monitoring the terminal voltage of the battery 22 by monitoring the voltage across the series connection of the diode 28 and the battery 22. The means for monitoring the terminal voltage includes an inductor 30 and capacitor 31, which cooperate to provide a hash filter or transient voltage filter so that the voltage responsive cut-off circuit 29 is responsive to the direct-current voltage level across the battery 22 rather than some spurious transient voltage. The means for monitoring the terminal voltage further includes a pair of Zener diodes 32 and 33, which act as a voltage level reference, and resistor 34 connected in series across the capacitor 31.

The voltage responsive cut-off circuit further includes a switch which is schematically shown as a silicon-controlled rectifier 35, which is responsive to the means for monitoring the terminal voltage for shorting the shunt winding 21 of the motor-generator 20 to prevent any further charging of the battery 22 upon the occurrence of the selected terminal voltage level across the battery 22. When the terminal voltage of the battery 22 exceeds the breakdown voltage of the Zener diodes 32 and 33 the Zener diodes will conduct, permitting current to flow through the resistor 34. The current flow through the resistor 34 causes a voltage drop, which appears as a difference in potential across the gate terminal of the rectifier 35 and causes the rectifier 35 to conduct, thereby short-circuiting the shunt winding 21.

The motor-generator system of FIG. 2 further includes means for protecting the cut-off circuit 29 from potentially damaging battery current which would flow through the cut-off circuit upon the accidental closing of the starter switch, which is required to bypass the diode 28 to permit the current to flow from the battery 22 to the motor-generator 20. This protection is provided by a single-pole, double-throw switch 36. Switch 36 has two fixed contacts 37 and 38 and a movable contact 39. The movable contact 39 is connected to the output terminal 26 of the motor-generator 20. Fixed contact 37 of the switch 36 is connected to the junction between diode 28 and battery 22. The other fixed contact 38 of the switch 36 is connected to one side of the cut-off circuit 29. In this way, when the starter switch, which is comprised of the movable contact 39 and fixed contact 37, is closed to provide a current path around the diode 28, the voltage responsive cut-off circuit 29 is disconnected from the battery 22 and the motor-generator 20 so that there is no current path through the cut-off circuit. Thus, the elements in the cut-off circuit 29 are never subjected to current caused by the battery 22 and may therefore have much lower current ratings than the comparable elements of the motor-generator system of FIG. 1. The only current that will flow through the silicon-controlled rectifier 35 after the initial pulse of current upon gating the rectifier 35 "on" will be a low-level current from the motor-generator 20, since the generated voltage producing the current will be minimal because of the shorting of the shunt winding 21. Thus, the potentially large current from the battery 22 through the silicon-controlled rectifier 35 is avoided and the silicon-controlled rectifier in the voltage responsive cut-off circuit may be made very small and lightweight. Additionally, current-limiting resistors are no longer required and, thus, the overall size, cost, and weight of the control circuit for the motor-generator system is significantly reduced.

The blocking diode 28 may alternatively be connected to the fixed contact 38 of the switch 36 as shown in FIG. 3, rather than directly to the output terminal 26 of the motor-generator 20. In either case, the operation will be the same.

In some cases it might be desired to connect the means for monitoring the terminal voltage of the battery directly across the series connection of the blocking diode and the battery or the battery alone. Such a connection is shown in FIG. 4. In this case, the means for monitoring the terminal voltage, representatively shown by block 44, is connected directly to output terminal 26 of the generator. Alternatively, the means 44 for monitoring the terminal voltage of the battery may be connected directly across the battery 22. In either case, the means for shorting the shunt winding of the motor-generator, representatively shown by block 45, will be the only part of the voltage responsive cut-off circuit connected through switch 36.

Various changes may be made in the details of construction without departing from the spirit and scope of the invention as defined by the appended claims.

What is claimed is:

1. In a motor-generator system having a motor generator with at least a shunt field winding and a battery for supplying the energy to operate the motor-generator as a motor, with the battery being recharged from the motor-generator when operating as a generator, a control circuit comprising a unilateral impedance element connected between said motor-generator and said battery, said element being poled to permit charging of said battery when the voltage from the motor-generator exceeds the battery voltage, a voltage responsive cut-off circuit including means for monitoring the voltage across said battery and means responsive to said monitoring means for shorting the shunt winding of said motor-generator, and means for selectively bypassing said impedance element to apply the battery voltage to said motor-generator and for opening the current path through at least said shorting means of said cut-off circuit.

2. A control circuit in accordance with claim 1, wherein the monitoring means comprises a voltage divider of at least one Zener diode in series with a resistor.

3. A control circuit in accordance with claim 2, wherein the shorting means comprises a silicon-controlled rectifier having its control gate connected to the junction of the Zener diode and the resistor.

4. A control circuit in accordance with claim 1, wherein the bypassing and preventing means comprises one fixed contact and a movable contact of a switch for bypassing and opening another fixed contact and the movable contct of the switch for opening, with the contacts being positioned to open the contact for opening upon closing the circuit through the conact for bypassing.

5. In a motor-generator system having a motor-generator with at least a shunt winding and a first output terminal and a second output terminal and a battery for supplying the energy to operate the motor-generator as a motor, with the battery being recharged from the motor-generator when operating as a generator, a control circuit comprising a unilateral impedance element connected in series with said battery; means for connecting said series connection directly across the output terminals of said motor-generator with the impedance element end of the series connection being connected to said output terminal; a voltage responsive cut-off including means for monitoring the terminal voltage of said battery and means responsive to said monitoring means for shorting the shunt winding of said motor-generator, said monitoring means having a first terminal and a second terminal and said shorting means having a first terminal and a second terminal; a single-pole, double-throw switch having two fixed contacts and one movable contact, means for connecting the movable contact of said switch to the first output terminal of said motor-generator; means for connecting one fixed contact of said switch to the junction between said impedance element and said battery of said series connection; means for connecting the other fixed contact of said switch to the first terminals of said monitoring means and said shorting means in common; and means for connecting the second terminals of said monitoring means and said shorting means in common to the second output terminal of said motor-generator.

6. In a motor-generator system having a motor-generator with at least a shunt field winding, a first output terminal and a second output terminal and a battery for supplying the energy to operate the motor-generator as a motor, with the battery being recharged from the motor-generator when operating as a generator, a control circuit comprising a unilateral impedance element connected in series with said battery; a voltage responsive cut-off including means for monitoring the terminal voltage of said battery and means responsive to said monitoring means for shorting the shunt winding of said motor-generator, said monitoring means having a first terminal and a second terminal and said shorting means having a first terminal and a second terminal; means for connecting the second terminals of said monitoring means and said shorting means in common to the first output terminal of said motor-generator; means for connecting one terminal of said battery to the first output terminal of said motor-generator; a single-pole, double-throw switch having two fixed contacts and a movable contact; means for connecting the movable contact of said switch to the second output terminal of said motor-generator; means for connecting one fixed contact of said switch to the junction between said impedance element and said battery of said series connection; and means for connecting the other fixed contacts of said switch to the impedance element terminal of said series connection and to the first terminals of said monitoring means and said shorting means in common.

7. In a motor-generator system having a motor-generator with at least a shunt field winding, a first output terminal and a second output terminal and a battery for supplying the energy to operate the motor-generator as a motor, with the battery being recharged from the motor-generator when operating as a generator, a control circuit comprising a unilateral impedance element connected in series with said battery; means for connecting said series connection across the output terminals of said motor-generator; means for monitoring the terminal voltage of said battery; means responsive to the monitoring means for shorting the shunt winding of said motor-generator; a single-pole, double-throw switch having two fixed contacts and a movable contact; means for connecting the movable contact of said switch to the first output terminal of said motor-generator; means for connecting one fixed contact of said switch to the junction between said impedance element and said battery of said series connection; means for connecting the other fixed contact of said switch to one side of said shorting means; means for connecting the other side of said shorting means to the second terminal of said motor-generator; means for connecting one side of said monitoring means to the first output terminal of said motor-generator; and means for connecting the other side of said monitoring means to the second terminal of said motor-generator.

8. In a motor-generator system having a motor-generator with at least a shunt field winding, a first output terminal and a second output terminal and a battery for supplying the energy to operate the motor-generator as a motor, with the battery being recharged from the motor-generator when operating as a generator, a control circuit comprising a unilateral impedance element connected in series with said battery; means for monitoring the terminal voltage of said battery; means responsive to said monitoring means for shorting the shunt winding of said motor-generator; a single-pole, double-throw switch having two fixed contacts and a movable contact, means for connecting the movable contact of said switch to the first output terminal of said motor-generator; means for connecting one fixed contact of said switch to the junction between said impedance element and said battery of said series connection, means for connecting the other fixed contact of said switch to the impedance element side of said series connection and to one side of said shorting means; means for connecting the other side of said shorting means to the second output terminal of said motor-generator; means for connecting one side of said monitoring means to the junction between said impedance element and said battery of said series connection; means for connecting the other side of said monitoring means to the second output terminal of said motor-generator; and means for connecting the battery to the second output terminal of said motor-generator.

References Cited
UNITED STATES PATENTS

| | | | |
|---|---|---|---|
| 2,991,370 | 7/1961 | Sutton | 290—38 |
| 3,264,483 | 8/1966 | Alexander | 290—38 |
| 3,270,207 | 8/1966 | Stockton | 290—46 X |
| 3,405,293 | 10/1968 | Burkett et al. | 290—38 X |
| 3,407,306 | 10/1968 | Huntzinger | 290—38 |

J D MILLER, Primary Examiner

J. M. GUNTHER, Assistant Examiner

U.S. Cl. X.R.

290—38, 46, 50